(12) United States Patent
Mao

(10) Patent No.: US 11,403,931 B2
(45) Date of Patent: Aug. 2, 2022

(54) VEHICLE OCCUPANCY REMINDER SYSTEM

(71) Applicant: Fenglou Mao, Potomac, MD (US)

(72) Inventor: Fenglou Mao, Potomac, MD (US)

( * ) Notice: Subject to any disclaimer, the term of this patent is extended or adjusted under 35 U.S.C. 154(b) by 0 days.

(21) Appl. No.: 16/460,338

(22) Filed: Jul. 2, 2019

(65) Prior Publication Data
US 2020/0193792 A1 Jun. 18, 2020

Related U.S. Application Data

(60) Provisional application No. 62/781,424, filed on Dec. 18, 2018.

(51) Int. Cl.
| | | |
|---|---|---|
| *G06K 9/00* | (2022.01) | |
| *G08B 21/02* | (2006.01) | |
| *G08B 21/18* | (2006.01) | |
| *G08B 21/24* | (2006.01) | |
| *G10L 13/00* | (2006.01) | |
| *G06V 20/59* | (2022.01) | |
| *G06V 40/16* | (2022.01) | |
| *B60H 1/00* | (2006.01) | |
| *H04N 5/225* | (2006.01) | |
| *B60Q 1/50* | (2006.01) | |

(52) U.S. Cl.
CPC ........... *G08B 21/02* (2013.01); *G06V 20/593* (2022.01); *G06V 40/166* (2022.01); *G08B 21/182* (2013.01); *G08B 21/24* (2013.01); *G10L 13/00* (2013.01); *B60H 1/00742* (2013.01); *B60H 1/00792* (2013.01); *B60Q 1/50* (2013.01); *H04N 5/2253* (2013.01)

(58) Field of Classification Search
CPC ........... G06K 9/00221; G06K 9/00268; G06K 9/00832; G06K 9/00838
See application file for complete search history.

(56) References Cited

U.S. PATENT DOCUMENTS

| | | | |
|---|---|---|---|
| 6,507,779 B2 | 1/2003 | Breed et al. | |
| 9,403,437 B1* | 8/2016 | McDonald | G08B 21/24 |
| 9,565,402 B2 | 2/2017 | Veneziano et al. | |
| 9,847,004 B1* | 12/2017 | Lan | G08B 21/22 |
| 9,937,830 B1* | 4/2018 | Curry, V | B60N 2/879 |
| 10,457,200 B2* | 10/2019 | Gage | G08B 21/22 |
| 2002/0029103 A1* | 3/2002 | Breed | B60R 21/0154 |
| | | | 701/45 |
| 2007/0159531 A1 | 7/2007 | Anderson | |
| 2008/0069403 A1* | 3/2008 | Breed | G06K 9/00832 |
| | | | 382/104 |
| 2008/0309765 A1* | 12/2008 | Dayan | H04N 7/185 |
| | | | 348/158 |

(Continued)

*Primary Examiner* — Guillermo M Rivera-Martinez
(74) *Attorney, Agent, or Firm* — Boudwin Intellectual Property; Daniel Boudwin

(57) ABSTRACT

A vehicle occupancy reminder system. The system includes at least one camera mounted to an interior surface of a motor vehicle. The camera is in operable connection with a processor. The processor is configured to perform a first logic. The first logic is a facial recognition program. The facial recognition program is configured to detect the presence of an individual or multiple individuals. The facial recognition program is configured to enact an alarm protocol when the facial recognition program detects the presence of any individuals.

16 Claims, 3 Drawing Sheets

(56) References Cited

U.S. PATENT DOCUMENTS

| | | | | |
|---|---|---|---|---|
| 2009/0027188 A1* | 1/2009 | Saban | ............... | B60N 2/002 340/521 |
| 2009/0146813 A1* | 6/2009 | Nuno | ............... | G08B 21/22 340/572.1 |
| 2009/0290021 A1* | 11/2009 | Rudesill | ............ | B60R 1/008 348/148 |
| 2012/0268265 A1* | 10/2012 | Morley | ............ | B60N 2/002 340/457 |
| 2013/0049946 A1 | 2/2013 | Chavez | | |
| 2015/0266395 A1* | 9/2015 | Bradley | ............ | B60N 2/002 701/1 |
| 2015/0286882 A1* | 10/2015 | Nicol | ............ | G06K 9/00838 348/148 |
| 2017/0043783 A1* | 2/2017 | Shaw | ............ | B60N 2/28 |
| 2017/0104963 A1* | 4/2017 | Veneziano | ......... | H04N 5/23206 |
| 2017/0116839 A1 | 4/2017 | Friedman | | |
| 2017/0326946 A1* | 11/2017 | Jacob | ............ | B60H 1/00778 |
| 2018/0099587 A1* | 4/2018 | Schonfeld | ........... | B60N 2/3086 |

\* cited by examiner

VEHICLE OCCUPANCY REMINDER SYSTEM

CROSS REFERENCE TO RELATED APPLICATIONS

This application claims the benefit of U.S. Provisional Application No. 62/781,424 filed on Dec. 18, 2018. The above identified patent application is herein incorporated by reference in its entirety to provide continuity of disclosure.

BACKGROUND OF THE INVENTION

The present invention relates to a vehicle occupancy reminder system. More specifically, the present invention relates to a system, integrable with a motor vehicle, configured to detect the presence of an individual or multiple individuals in combination with an unsafe temperature and to enact an alarm protocol upon that detection.

Every year, tragedies occur as busy, or otherwise distracted parents or caretakers forget to collect their children from their vehicles. When children are left in vehicles while exposed to high or to low temperatures, serious medical risks, including heat stroke, hypothermia, or death may occur. In addition to parents or relative caretakers, bus drivers are also charged with the safety of children. Therefore, there is a defined need amongst the known art for a versatile system of notifying parents, or other caretakers, of the presence of an individual, such as a child, if such an individual is left in an automobile.

SUMMARY OF THE INVENTION

In view of the foregoing disadvantages inherent in the known types of vehicle occupancy reminder systems now present in the prior art, the present invention provides a vehicle occupancy reminder system wherein the same can be utilized for providing convenience for the user when notifying a parent or caretaker of the presence of an individual or multiple individuals in a parked motor vehicle.

The present system comprises at least one camera disposed in a compartment of a motor vehicle. The camera is mounted to an interior surface of a motor vehicle such that images are recorded of the targeted area. The camera is in operable connection with a processor. The processor is configured to perform a first logic. The first logic is a facial recognition program. The facial recognition program is configured to detect a presence of an individual or multiple individuals. The facial recognition program is configured to enact an alarm protocol when the facial recognition program detects the presence of an individual or multiple individuals.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
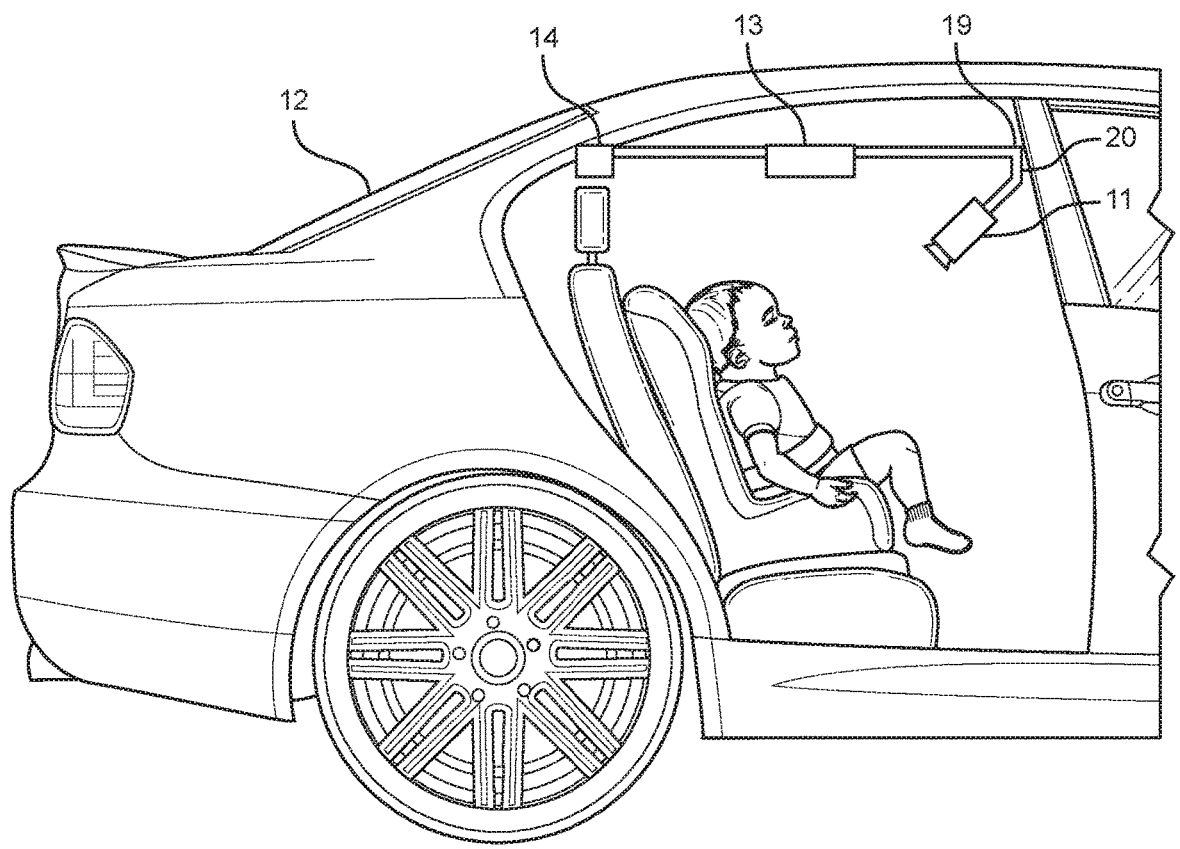
FIG. 1 shows a perspective view of an embodiment of the vehicle occupancy reminder system.

Reference is made herein to the attached drawings. Like reference numerals are used throughout the drawings to depict like or similar elements of the vehicle occupancy reminder system. The figures are intended for representative purposes only and should not be considered to be limiting in any respect.

Referring now to FIG. 1, there is shown a perspective view of an embodiment of the vehicle occupancy reminder system. The vehicle occupancy reminder system comprises at least one camera 11. The camera 11 is configured to record a video feed of a targeted area, such as the backseat of an automobile 12. The camera 11 is mounted to an interior surface of the automobile 12. In the illustrated embodiment, the camera 11 is directed towards a child seat in the back seat of the automobile 12. As such, the camera 11 will more effectively be able to record the presence, or lack thereof, of a child secured in the child seat. The camera 11 is in operable connection with a processor 13. The processor 13 is a part of a computing system, wherein the computing system further comprises a non-transitory computer-readable medium, and one or more logics stored in the non-transitory computer-readable medium and executable by the processor to perform one or more methods, as described elsewhere herein.

In another embodiment, the camera 11 comprises a mount 19. The mount 19 is configured to hold the camera 11 in a desired position. For example, the mount 19 is shaped such that the camera 11 is held in a downward position. In a further embodiment, the mount 19 comprises a rotatable joint 20, such that the position of the camera 11 is freely adjustable by the user. By allowing for a camera 11 that is freely adjustable, the user will be able to position the camera 11 to the most effective position for recording a targeted area.

Furthermore, in another embodiment, the vehicle occupancy reminder system further comprises at least one thermometer 14. The thermometer 14 is configured to record a temperature of the targeted area. The thermometer 14 is any suitable device that is capable of recording the temperature of an area. In one embodiment, the thermometer 14 is an electric thermometer. The thermometer is in operable connection with the processor 13, such that temperature data gathered by the thermometer is analyzed by the processor 13.

Figure 2:
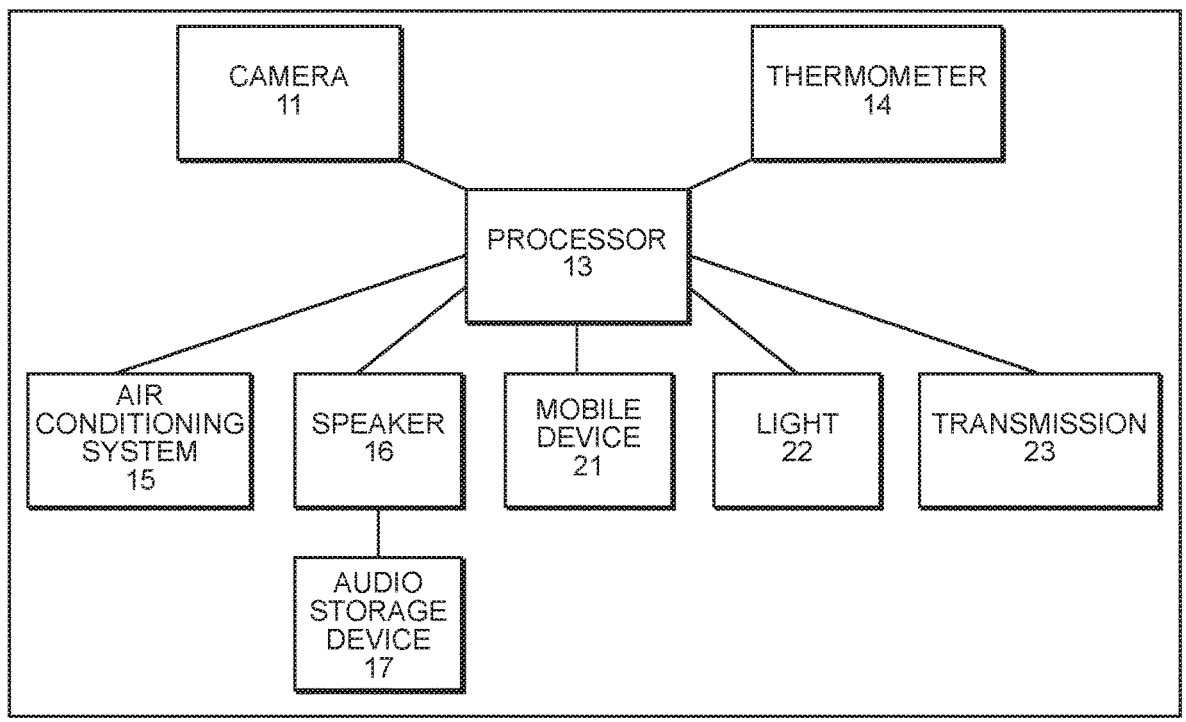
FIG. 2 shows a block diagram of an embodiment of the vehicle occupancy reminder system.

Referring now to FIG. 2, there is shown a block diagram of an embodiment of the vehicle occupancy reminder system. The camera 11 is in operable connection with a processor 13. Additionally, the thermometer 14 is in operable connection with the processor 13. As such, the processor 13 is able to monitor the temperature in the targeted area. The processor 13 is configured to enact an alarm protocol, such that when specific conditions are met, specific actions are put into effect by the processor 13. For example, the alarm protocol can be enacted when the camera detects the presence of an individual or multiple individuals.

In one embodiment, an air conditioning system 15 is in operable connection with the processor 13. As such, when the alarm protocol is enacted, the air conditioning system is actuated. As such, the temperature is reduced in the targeted area. In one embodiment, the air conditioning system 15 is integrated upon a vehicle itself (i.e. the vehicle air conditioning system). In an alternate embodiment, the air conditioning system 15 is a separately installed system from the vehicle air conditioning system, such as a plurality of window-mounted fans. By reducing the temperature in a targeted area, such as the inside of a parked car, the risk of ailments such as heat exhaustion and heat stroke are reduced.

In another embodiment, at least one speaker 16 is in operable connection with the processor 13. In a further embodiment, the speaker 16 comprises an audio storage device 17 and is configured to play a prerecorded message or play a predefined message by using a text-to-speech engine. The prerecorded or predefined message is stored on the audio storage device 17. In one embodiment, the speaker 16 is an integrated speaker upon a sound system of a vehicle. In another embodiment, the speaker 16 is a speaker that is independent from the sound system of the vehicle. The prerecorded or predefined message may be any message that is designed to alert individuals to the alarm protocol. For example, a car alarm system may be operably connected to the processor 13, such that if a child is trapped in a car, the alarm system will be engaged to auditorily alert bystanders to the presence of the child.

In a further embodiment, a mobile device 21 is in operable connection with the processor 13. The mobile device 21 is configured to receive a notification from the processor 13 when the processor 13 engages the alarm protocol. As such, the user will be alerted by the processor 13 if they are away from the vehicle and the alarm protocol is enacted. In an alternate embodiment, the vehicle occupancy reminder system is able to be activated and deactivated via the mobile device 21.

In a further embodiment, a light 22 is in operable connection with the processor 13. The light 22 is configured to be actuated when the processor 13 engages the alarm protocol. In one embodiment, the light 22 is a light system integrated upon the vehicle, such as a headlight, a turning signal light, or a hazard light. In another embodiment, the light 22 is independent from the vehicle light system. The light 22 is configured to visually alert bystanders to the alarm protocol.

In yet another embodiment, the processor 13 is in operable connection with the transmission 23 of the motor vehicle. As such, the vehicle occupancy reminder system is activated when the transmission 23 is placed into park. Furthermore, the vehicle occupancy reminder system is deactivated when the transmission 23 is removed from park. As such, the vehicle occupancy reminder system is engaged specifically in situations where the user is away from the vehicle.

Figure 3:
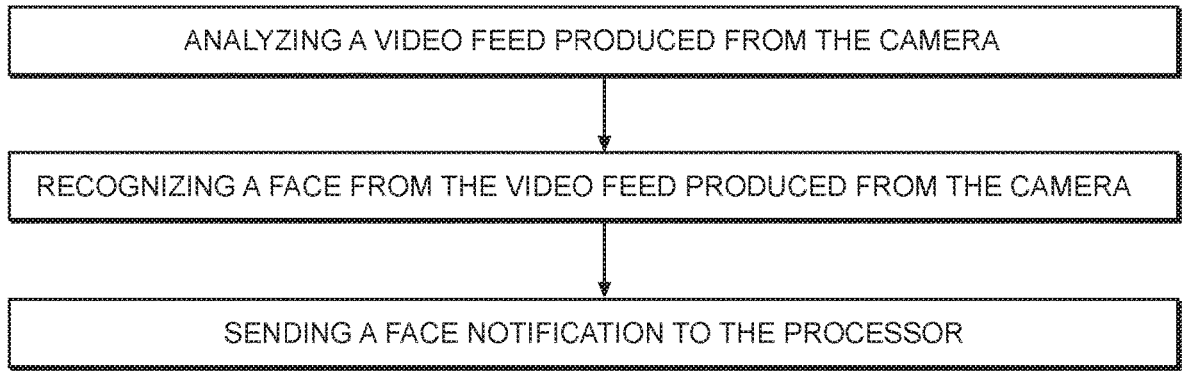
FIG. 3 shows a flowchart of a first logic of an embodiment of the vehicle occupancy reminder system.

Referring now to FIG. 3, there is shown a flowchart of a first logic of an embodiment of the vehicle occupancy reminder system. The processor is configured to perform a first logic. The first logic is a facial recognition program. The facial recognition program is configured to detect a presence of an individual or multiple individuals via the camera. In the illustrated embodiment, a video feed produced by the camera is analyzed. The first logic is configured to recognize a face from the video feed produced by the camera. The first logic is any known method of video analysis designed to identify the presence of a human face. In one embodiment, the first logic is configured to enact the alarm protocol when a human face is detected. In another embodiment, a face notification is sent to the processor when the human face is detected.

Figure 4:
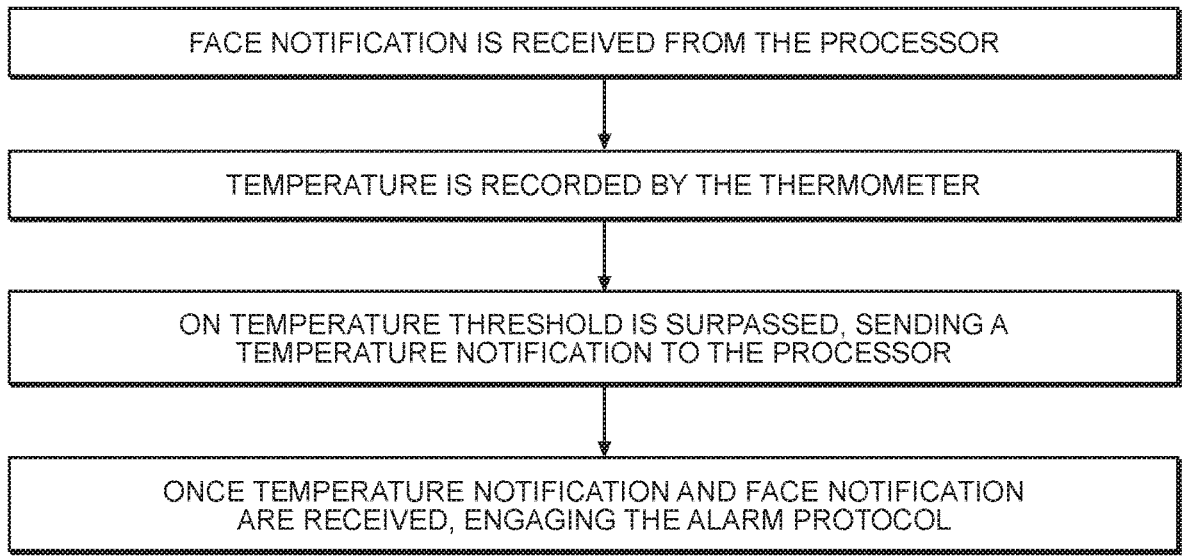
FIG. 4 shows a flowchart of a second logic of an embodiment of the vehicle occupancy reminder system.

Referring now to FIG. 4, there is shown a flowchart of a second logic of an embodiment of the vehicle occupancy reminder system. The processor may additionally be configured to perform a second logic. The second logic is an alarm program. The alarm program is configured to enact the alarm protocol when a threshold temperature is surpassed as detected by the thermometer. In one embodiment, the processor is configured to perform the second logic only when the first logic detects the presence of an individual or multiple individuals.

In an alternate embodiment, the alarm protocol is terminated once the facial recognition program no longer detects the presence of an individual. As such, if the user is notified by the alarm protocol and removes the individual from the targeted area, the alarm protocol will no longer be engaged and the elements activated thereby will cease to operate and will no longer notify the user and bystanders of an individual's presence in the targeted area.

Figure 5:
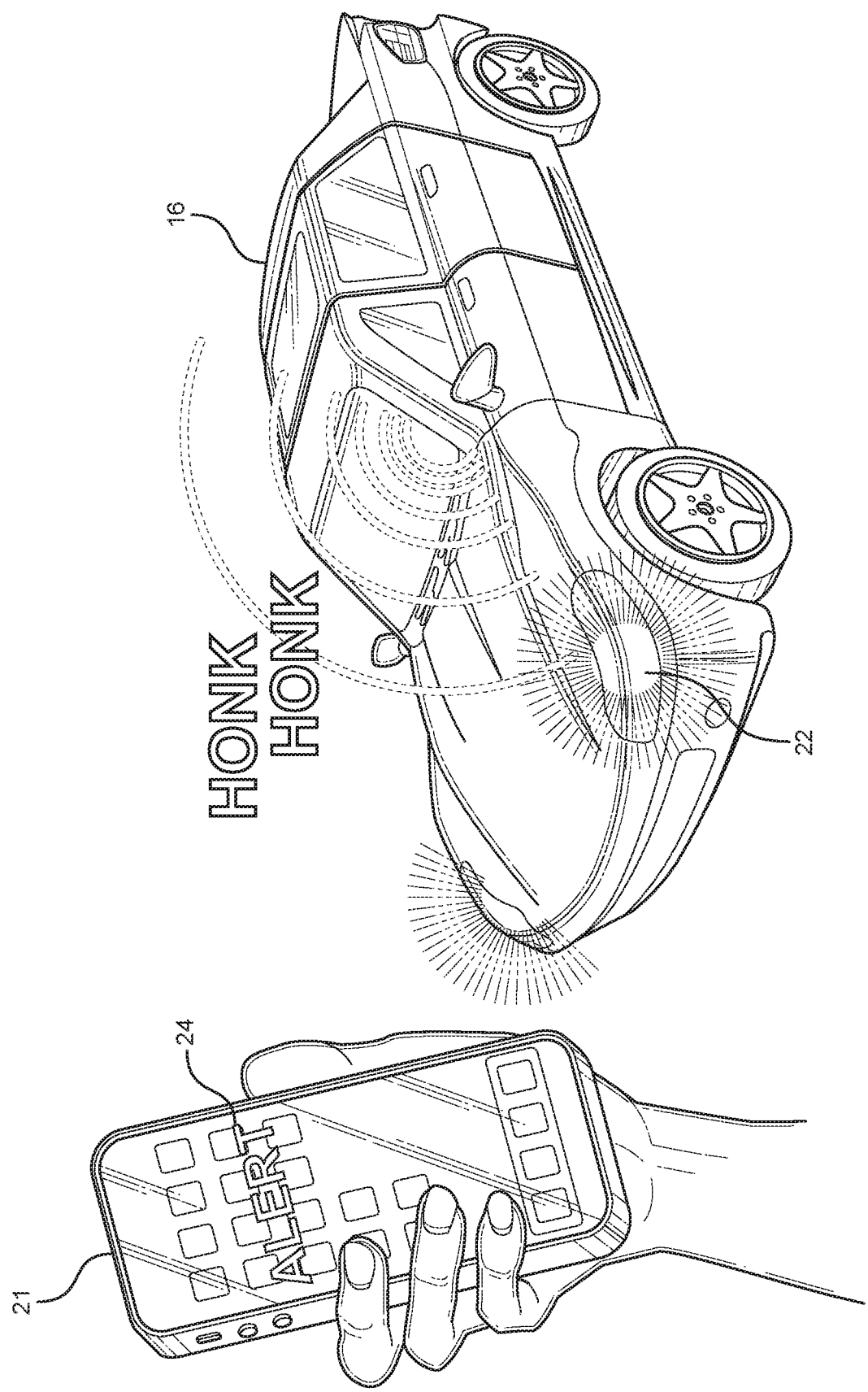
FIG. 5 shows a perspective view of an embodiment of the vehicle occupancy reminder system.

Referring now to FIG. 5, there is shown a perspective view of an embodiment of the vehicle occupancy reminder system in use. Once the alarm protocol is engaged, the elements associated with the alarm protocol are actuated by the processor. In the illustrated embodiments, the speakers 16 are actuated. Additionally, the light 22 is actuated by the processor as a result of the alarm protocol being engaged. Furthermore, a notification 24 is displayed on the mobile device 21 as a result of the alarm protocol being engaged. In the illustrated embodiment, the processor has simultaneously actuated every element associated with the alarm protocol.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle occupancy reminder system, comprising:
   at least one camera;
   wherein the camera is mounted to an interior surface of a motor vehicle such that images are recorded of a targeted area;
   the camera in operable connection with a processor;
   wherein the camera comprises a mount attached thereto;
   wherein the mount comprises a rotatable joint, such that a position of the camera is freely adjustable;
   the mount positioned to hold the camera in a downward position;
   the processor configured to perform a first logic;
   wherein the first logic is a facial recognition program;
   wherein the facial recognition program is configured to detect a presence of an individual;

wherein the facial recognition program is configured to enact an alarm protocol when the facial recognition program detects the presence of an individual;
wherein the alarm protocol is terminated once the facial recognition program no longer detects the presence of the individual.

2. The vehicle occupancy reminder system of claim 1, further comprising:
at least one thermometer;
wherein the thermometer is configured to detect a temperature;
the thermometer in operable connection with the processor;
the processor configured to perform a second logic;
wherein the second logic is an alarm program;
wherein the alarm program is configured to enact an alarm protocol when the temperature is greater than a threshold temperature.

3. The vehicle occupancy reminder system of claim 1, wherein an air conditioning system is in operable connection with the processor, such that when the alarm protocol is enacted, the air conditioning system is activated.

4. The vehicle occupancy reminder system of claim 1, wherein at least one speaker is in operable connection with the processor, such that when the alarm protocol is enacted, the speaker is activated.

5. The vehicle occupancy reminder system of claim 4, wherein the speaker is configured to play a prerecorded audio message.

6. The vehicle occupancy reminder system of claim 4, wherein the speaker is configured to play a predefined message using a text-to-speech engine.

7. The vehicle occupancy reminder system of claim 2, wherein the processor is configured to perform the second logic only when the first logic detects the presence of the individual.

8. The vehicle occupancy reminder system of claim 1, wherein a mobile device is in operable connection with the processor, such that when the alarm protocol is enacted, a notification is sent from the processor to the mobile device.

9. The vehicle occupancy reminder system of claim 1, wherein a light is in operable connection with the processor, such that when the alarm protocol is enacted, the light is activated.

10. The vehicle occupancy reminder system of claim 1, wherein the vehicle occupancy reminder system is activated when the motor vehicle is placed into a parked position.

11. The vehicle occupancy reminder system of claim 1, wherein the vehicle occupancy reminder system is deactivated when the motor vehicle is placed into a non-parked position.

12. The vehicle occupancy reminder system of claim 1, wherein the vehicle occupancy reminder system is activatable and deactivatable via a mobile device.

13. A vehicle occupancy reminder system, comprising:
at least one camera;
wherein the camera is mounted to an interior surface of a motor vehicle such that images are recorded of a targeted area;
the camera in operable connection with a processor;
wherein the camera comprises a mount attached thereto;
wherein the mount comprises a rotatable joint, such that a position of the camera is freely adjustable;
the mount positioned to hold the camera in a downward position;
the processor configured to perform a first logic;
wherein the first logic is a facial recognition program;
wherein the facial recognition program is configured to detect a presence of an individual;
at least one thermometer;
wherein the thermometer is configured to detect a temperature;
the thermometer in operable connection with the processor;
the processor configured to perform a second logic;
wherein the second logic is an alarm program;
wherein the alarm program is configured to enact an alarm protocol when the temperature is greater than a threshold temperature;
wherein the alarm protocol is terminated once the facial recognition program no longer detects the presence of the individual.

14. The vehicle occupancy reminder system of claim 1, wherein the mount comprises a singular rotatable joint.

15. The vehicle occupancy reminder system of claim 3, wherein the air conditioning system is an air conditioning system that is integrated upon the vehicle itself.

16. The vehicle occupancy reminder system of claim 3, wherein the air conditioning system is an air conditioning system that is a separately installed system from the vehicle air conditioning system.

* * * * *